Figure 1:
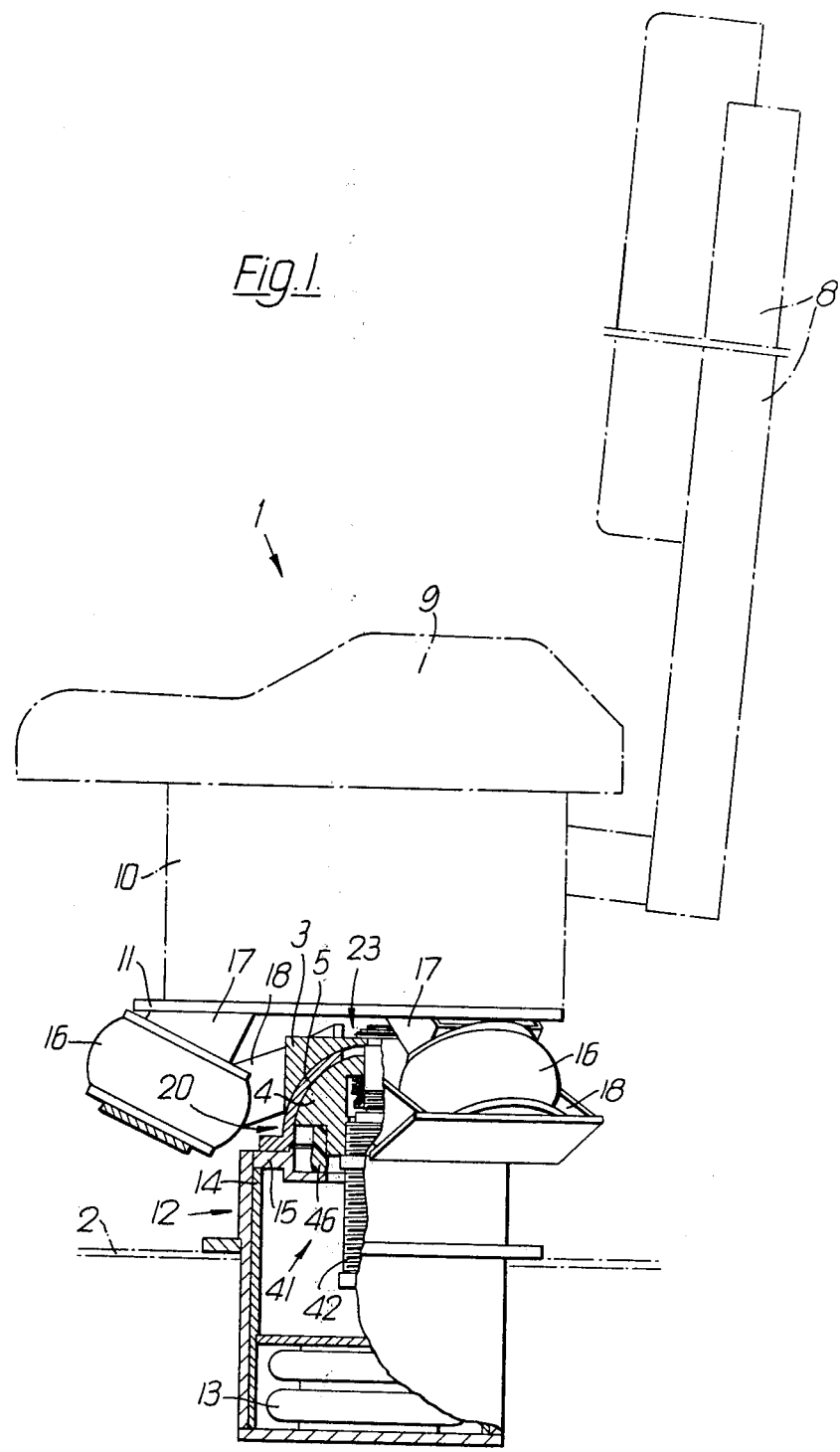

United States Patent [19]

Kjellstrand et al.

[11] 4,273,461
[45] Jun. 16, 1981

[54] COUPLING OF THE BALL-AND-SOCKET JOINT TYPE

[76] Inventors: Gunnar M. T. Kjellstrand, Framnäsvägen 3; Olof Olofsson, Hotellvägen 10, both of S-683 00 Hagfors; Anders G. Linder, Bergsvägen 12, S-663 00 Skoghall, all of Sweden

[21] Appl. No.: 52,229

[22] Filed: Jun. 26, 1979

[30] Foreign Application Priority Data

Jul. 13, 1978 [SE] Sweden .............................. 7807787

[51] Int. Cl.³ ........................ F16C 11/06; F16D 1/12
[52] U.S. Cl. ..................................... 403/125; 403/123; 403/90
[58] Field of Search .................. 403/125, 124, 123, 90, 403/87, 77, 76, 56; 248/397, 398

[56] References Cited

U.S. PATENT DOCUMENTS

| | | | |
|---|---|---|---|
| 938,219 | 10/1909 | Crumb | 403/125 X |
| 2,126,389 | 8/1938 | Hufferd | 403/123 X |
| 2,211,817 | 8/1940 | Hufferd et al. | 403/124 X |
| 2,571,443 | 10/1961 | Hair | 403/125 X |
| 3,254,885 | 6/1966 | Rumsey | 403/90 X |

*Primary Examiner*—James Kee Chi
*Attorney, Agent, or Firm*—Murray and Whisenhunt

[57] ABSTRACT

This invention relates to a coupling of the ball-and-socket joint type between two objects. Connected to the one object, which may be a driver's seat in a working vehicle is a joint socket and a joint ball with a gap between them. Connected to the other object, which may consist of a base for a driver's seat, for example, is a coupling element in the form of a spherical shell disposed in the gap between the joint socket and the joint ball. The latter are pressed towards one another by means of powerful cup springs so that the spherical shell is locked firmly and the two objects are thus located in relation to one another. The grip of the spring force can be cancelled by means of a tightening element connected to the joint ball, as a result of which the coupling becomes movable again so that new positions can be adopted. The coupling can be used in various connections where it is desired to adjust two objects in relation to one another simply, securely and quickly.

9 Claims, 2 Drawing Figures

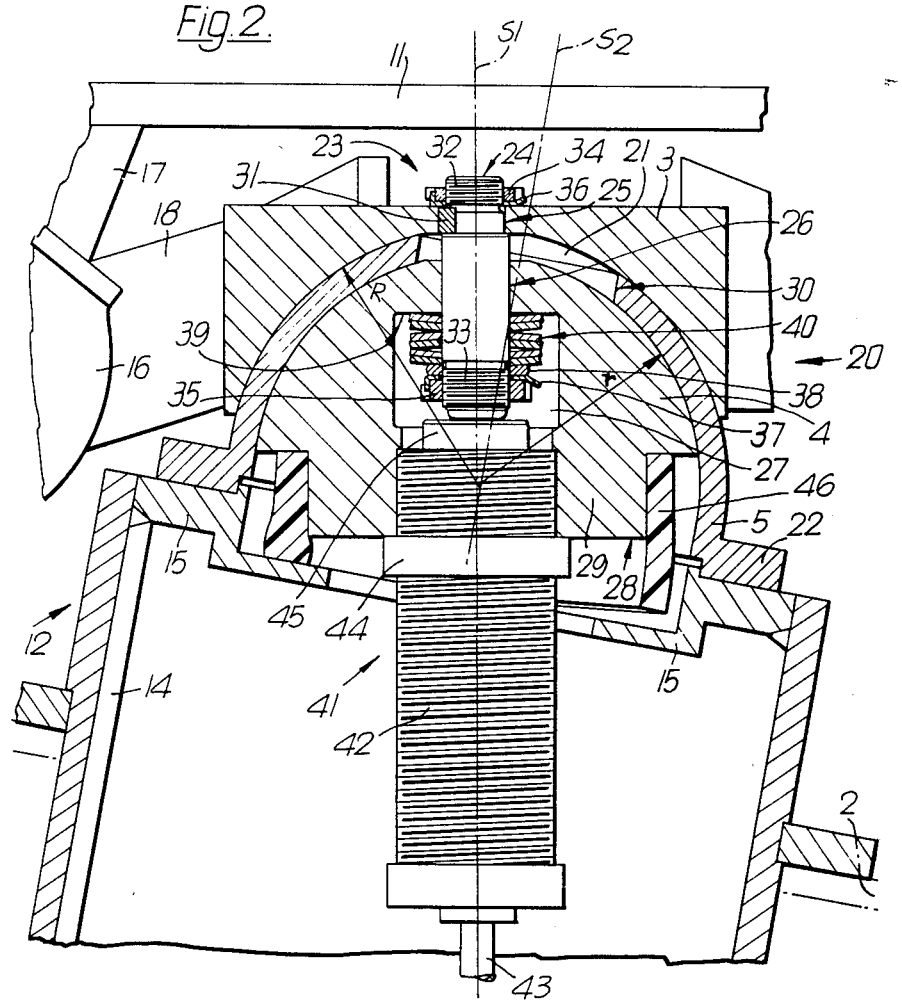

COUPLING OF THE BALL-AND-SOCKET JOINT TYPE

BACKGROUND OF THE INVENTION

The present invention relates to a coupling of the ball-and-socket joint type between two objects, comprising coupling members connected to each object. The one object may consist, for example, of a work table, a tool, weapon or instrument holder etc. while the other object may consist for example, of a stand, a foot or a base etc. for example for one of the first-named objects.

A particularly advantageous field of application for the coupling according to the invention is for driver's seats in working vehicles such as forestry machines, agricultural machines, earth movers, excavators etc. The technical development of this type of vehicles has been very rapid. The same applies to the development on the military side for example of tanks. The development of driver ergonomics has not kept pace, however. In certain cases—despite the fact that the driver's technical aids have certainly been improved—it may even be maintained that driver ergonomics have become worse since the stresses have increased in keeping with the better traversability of the terrain, the higher speeds etc. There are therefore great deficiencies still both in older and in newly constructed machines with regard to driver's seats inter alia, and the cases of sickness directly related to faulty ergonomics are common. In order to avoid various form of fatigue through faulty positions of the body, therefore, the driver's working milieu must be radically renewed and an ergonomically logical development of the seat must take place. Particularly noteworthy is the need of for devices for making the driver's seat horizontal in working vehicles in forestry and agriculture, in mines and other work places. In forestry one can point out, inter alia, how extremely tiring it is to work for long shifts in a machine which is standing on inclined ground without any possibility of making the work seat horizontal. In agriculture, ploughing work involves heavy stresses on the back as a result of the fact that the machine is inclined the whole time. The need for couplings by means of which the driver's seat can be made horizontal or otherwise be adjusted in relation to a base is therefore very great.

THE INVENTION IN BRIEF

It is therefore an object of the present invention to offer a coupling by means of which a driver's seat in a working vehicle can be made horizontal or otherwise be adjusted in a desired manner in relation to a base so as to meet the justified demand for comfort and good ergonomics. More specifically, it is an object to offer a coupling by means of which this adjustment can be carried out very simply, securely and quickly.

Although the invention sprang from the need in the ergonomic field for working vehicles, its use is not restricted to this field which has already been discussed in the introduction. Thus it is a more general object of the invention to offer a coupling by means of which two objects can be adjusted in relation to one another simply, securely and quickly, for example an instrument in relation to a stand to aim the instrument at a target; a tool in relation to a tool-holder in order to machine a workpiece etc.

This and other objects can be achieved in that the coupling member which is connected to one of the two objects which are to be adjusted in relation to one another comprises on the one hand a joint socket with a certain spherical radius, on the other hand a joint ball with a smaller radius that that of the joint socket, the central axis of the joint ball when fixed coinciding with that of the joint socket and a gap with a width corresponding to the difference between said radii being formed between the joint socket and the joint ball. Furthermore, the coupling member which is connected to the other object comprises a spherical shell which is disposed between the joint socket and the joint ball and the outer and inner radii of which coincide with the radii of the joint socket and the joint ball so that said shell can completely fill in the gap between the joint socket and the joint ball and can be displaced in various directions by sliding in said gap. Moreover, means are provided to enable the joint ball and the joint socket to be conveyed with force towards one another so that the interposed shall can be locked in the desired position and so also lock the two objects in the desired position in relation to one another.

FIGURES

The figures show by way of example a preferred form of embodiment and application of the coupling according to the invention. In the Figures FIG. 1 shows, from the side, a coupling which constitutes a connection between a driver's seat and a base, and FIG. 2 shows the same coupling in more detail through a vertical section illustrating how the coupling can be used to make the seat horizontal when the vehicle is inclined.

DESCRIPTION OF THE PREFERRED FORM OF EMBODIMENT

Referring first to FIG. 1, a driver's seat, illustrated diagrammatically, in a working vehicle has generally been designated by 1, while the floor in the driver's cab is designated by 2. The seat 1 comprises a back-seat 8, a seat 9 and a frame 10 with a frame bottom 11. Disposed below the bottom 11 of the frame are three vibration dampers 16 which are distributed evenly round a symmetrical axis $S_1$, FIG. 2. Upper and lower supporting arms for the vibration dampers 16 are designated 17 and 18 respectively. The upper supporting arms 17 are connected to the bottom 11 of the frame 10 of the seat 1.

A base is designated by 12. This is partially sunk in the floor 2 and is telescopic so as to be able to vary the height of the seat 1. For this purpose, a pair of hydraulic bellows cylinders 13 are provided which can press up a telescopically disposed inner drum 14, the upper part of which is designated by 15.

Disposed between the seat 1 and the base 12, or more specifically between the lower arms which support the vibration dampers 16 of the seat and the upper part 15 of the base is a coupling designated in general by 20. The construction of the coupling 20 is shown more in detail in FIG. 2. The coupling members which are connected to the seat 1 via the frame 10 and the vibration dampers 16 comprise on the one hand a joint socket 3 with a certain spherical radius R, and on the other hand a hemispherical joint ball 4 with a smaller radius r than that of the joint socket. The axis of symmetry $S_1$ of the joint ball 4 coincides with that of the joint socket and a gap 21 with a width corresponding to the difference $(R-r)$ between said radii is formed between the joint socket 3 and the joint ball 4. The lower supporting arms 18 of the vibration dampers 16 are connected to the cylindrical wall of the joint socket 3. The joint socket 3 and the joint ball 4 each comprise a through axial hole 25 and 26 respectively. The joint ball 4 further comprises a cavity 27 which extends from the plane bottom 28 of the joint ball and which occupies a considerable proportion of the volume of the joint ball. The joint ball further comprises a neck 29.

The coupling member which is connected to the base 12 comprises a spherical shell 5 which is disposed in the gap 21 between the joint socket 3 and the joint ball 4. More specifically, the spherical shell 5 is hemispherical with outer and inner radii R and r respectively coinciding with the radii of the joint socket 3 and the joint ball 4, so that the spherical shell 5 completely fills in the width of the gap 21. At the bottom, the hemispherical shell 5 comprises an upturned surrounding flange 22 which is connected to the upper part 15 of the base 12. A circular opening extending axially through the cap of the shell 5 is designated by 30.

The coupling 20 is adapted to be locked firmly—located—in the desired position by a locking means which is designated in general by 23. The locking means 23 is adapted so that it can convey the joint ball 4 and the joint socket 3 by force towards one another so that the interposed shell 5 can be locked in the desired position and so also lock the seat 1 in the desired position in relation to the base 12 and the floor 2. The locking means 23 comprises a cylindrical locking pin 24 which fits in the unthreaded holes 25 and 26 in the joint socket 3 and the joint ball 4, the locking pin 24 passing through the opening 30 in the hemispherical shell 5, the diameter of which is three times as large as that of the joint pin in the region in front of the opening 30. The locking pin 24 is prevented from twisting in the holes 25 and 26 by means of a locking boss 31. The upper and lower ends 32 and 33 respectively of the locking pin 24 are threaded. Screwed onto the threaded portions is a so-called ballbearing nut 34 and 35 respectively with a locking washer 36 and 37 respectively. An ordinary plane washer is designated by 38. Disposed between the washer 38 and the end face 39 of the cavity 27 is a stack of cup springs 40 which are stacked on one another and which are held together by the locking pin 24. By screwing the nuts 34 and 35 together to a suitable extent, the springs 40 are pressed together until an adequate gripping force is reached between the joint socket 3 and the joint ball 4 for the interposed shell 5 to be locked firmly with sufficient force to be able to hold the seat 1 fixed in relation to the base in the position adopted.

In order to be able to release the coupling 20 when it is desired to adjust the seat 1 in a fresh position in relation to the base 12 and the floor 1, the coupling is also equipped with disengagement means, designated in general by 41. The disengagement means comprises an airhydraulic tightening element 42. The tightening element 42 consists of an air-hydraulic two-stage cylinder which is driven by compressed air. A connection to a compressed-air source is designated by 43. The necessary hydraulic oil is accommodated in the tightening element 42. Tightening elements of this type are manufactured by Leibfried Maschinenbau GmbH, German Federal Republic, and provide tightening forces of 3–30 kN with an operating pressure of 1–10 bar despite small installation dimensions. The wall of the tightening element 42 is threaded. The tightening element is screwed by its front portion into the outer threaded portion of the cavity 27 in the joint ball 4 and is held firmly by means of a locking ring 44. The tightening element 42 further extends through a circular opening 46' in the upper portion 15 of the base 12, which opening has a considerably larger diameter than the tightening element so that this can swing in various direction in the opening 46'. The same applies to the possibility of the locking pin 24 being able to move in the opening 30 in relation to the shell 5.

In the tightening element 42 there is a piston, the front portion 45 of which extends out of the tightening element. In this text, this part is called the piston rod 45. The piston rod 45 bears against the lower end of the locking pin 24. The conduit 43 is connected to the pneumatic system of the vehicle through a valve not illustrated. The valve can be opened by remote control, preferably by a control on the instrument panel of the vehicle, to give operating pressure to the tightening element 42.

The axis of symmetry of the base 12 is designated by $S_2$. In order that the seat 1 may automatically assume a horizontal position when the base 12 is completely vertical and the coupling 20 is disengaged, that is to say in order that the axes of symmetry $S_1$ and $S_2$ may be bcaused to coincide, a return member is provided. This return member also serves to prevent the coupling from losing all stability when it is disengaged. Said return member may, in principle, consist of springs of various types and construction between the joint ball 4 and the upper portion 15 of the base 12, for example a steel spring, the upper end of which is passed over the neck 29 of the joint ball 4. It is also possible to conceive of a plurality of resilient members disposed between said elements. According to the form of embodiment, however, one resilient element in the form of a collar 46 of a resilient material is provided. The collar 46 is fitted with a certain tension round the neck 29 of the joint ball 4 and bears in a coaxial position against the upper portion 15 of the base. When the joint ball 4 is inclined in relation to the base, the collar 46 is compressed at one side which gives the necessary stability to the coupling when it is disengaged. A suitable material for the collar 46 is a plastics rubber which is known under the trade name of ADIPRENE and which has very good elasticity and suitable resistance to deformation for this application.

Although the operation of the coupling should be clear from what precedes, it will nevertheless be further explained. In the fixed position, the joint socket 3 and the joint ball 4 are pressed towards one another by means of the cup springs 40. The transmission of force is effected by means of the locking pin 24 and the spring force is adjusted by the nuts 34 and 35. When it is desired to alter the position of the seat 1, for example in order to make it horizontal when the vehicle is inclined, or to incline the seat forwards or backwards to vary the working position, or to turn the seat in a fresh direction, the coupling is disengaged. The driver does this by means of a control, not illustrated, for example a button or lever on the instrument panel in the vehicle. A valve is thus opened so that compressed air is fed into the tightening element 42 through the conduit 43. Via an air-hydraulic power ratio, the piston rod 45 is pressed upwards with great force. The power ratio and the length of stroke of the piston rod 45 are selected so that the piston rod 45, with resistance from the springs 40, lifts up the locking pin a little so that the nut 34 is relieved. The coupling 20 is now disengaged and a new position can be adopted by rocking or turning the seat 1. The resilient collar 46 offers a certain resistance to the rocking movements however, by being resiliently deformed. When the desired position is reached, the feed pressure to the tightening element 42 is interrupted, whereupon the piston rod 45 returns to the position of rest and the cup springs 40 again lock the elements in the coupling firmly.

We claim:

1. A coupling of the ball-and-socket joint type for coupling a first object and a second object, said coupling comprising a first coupling member connected to the first object and a second coupling member connected to the second object, said first coupling member comprising a joint socket having a spherical radius (R) and a joint ball having a smaller radius (r) than that of the joint socket, the central axis of the joint ball when fixed coinciding with that of the joint socket, and a gap having a width corresponding to the difference (R−r) between said radii being formed between the joint socket and the joint ball, said second coupling member comprising a shell which is disposed between the joint socket and the joint ball and is the form of a portion of a sphere, the outer and inner radii (R and r) of which coincides with the radii (R and r) of said joint socket and said joint ball so that said shell can completely fill the gap between the joint socket and the joint ball and can be displaced in various directions by sliding in said gap, said coupling also including gripping means including at least one spring for urging said joint ball and said joint socket towards one another with sufficient force so that the interposed shell can be locked in the desired position to thereby lock the two objects in the desired position in relation to one another, and said coupling further comprising disengaging means for releasing said coupling when a fresh locking position is to be assumed, said disengaging means being an independent unit in relation to said gripping means and comprising means for compressing said at least one spring to at least a sufficient extent so as to cancel the gripping force exerted by said at least one spring so that the coupling is thereby released.

2. Coupling as claimed in claim 1 wherein said gripping means comprises a locking pin extending between the joint socket and the joint ball, and spring means for pressing the joint socket and the joint ball towards one another to thereby lock the interposed spherical shell.

3. A coupling as claimed in claim 2, wherein said spring means is at least one spring on the back of said joint ball remote from said gap and extending from said joint ball back and a stop on said locking pin.

4. Coupling as claimed in claim 1, wherein said disengaging means includes a tightening element which is fixed in one of said coupling members.

5. Coupling as claimed in claim 4, wherein said locking pin extends through axial holes in the joint socket and the joint ball and through a larger opening in the spherical shell, thereby permitting displacement of said shell in relation to the joint socket and the joint ball without hindering the locking pin, a cavity disposed in the joint ball at the back thereof, said at least one spring disposed in said cavity, and an end of the locking pin projecting out of said cavity.

6. A coupling as claimed in claim 5, wherein the tightening element is disposed axially in relation to the locking pin and includes a piston rod adapted to bear against the end of the locking pin which extends out of said cavity in the joint ball.

7. Coupling as claimed in claim 6, wherein said disengaging means is adapted to be controlled from a remote location.

8. Coupling as claimed in claim 6, wherein said coupling further includes a return member means to return said coupling member to a position of symmetry, and to damp the movements of the coupling, when said coupling is disengaged.

9. Coupling as claimed in claim 8, wherein said return member comprises at least one flexible element between the back of the joint ball and the object to which the spherical shell is connected.

* * * * *